Figure 2:
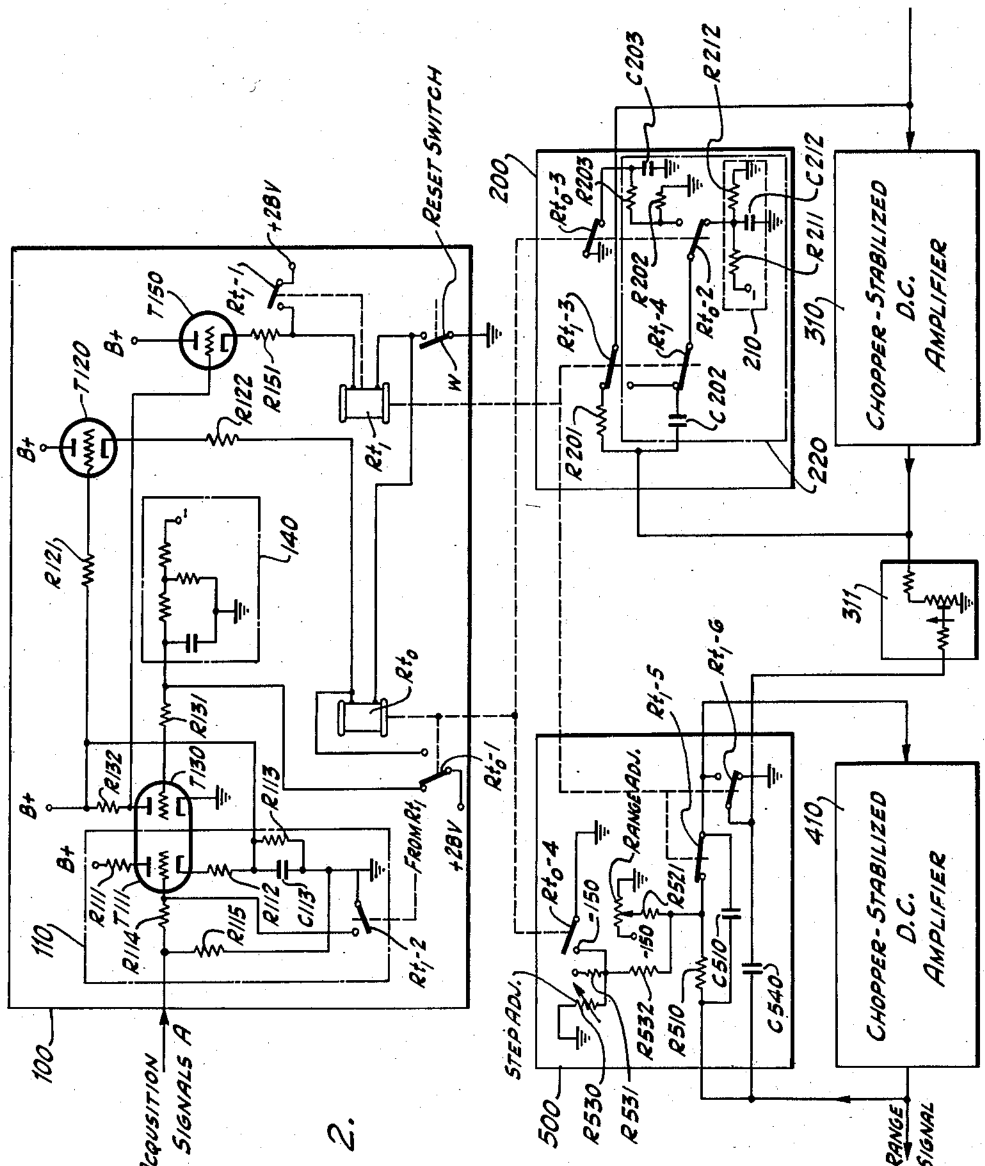

VARIABLE RANGE SIGNAL GENERATING CIRCUIT WITH MEANS FOR COMPUTING INITIAL VELOCITY
Filed March 7, 1955 2 Sheets-Sheet 1
FIG. 1.
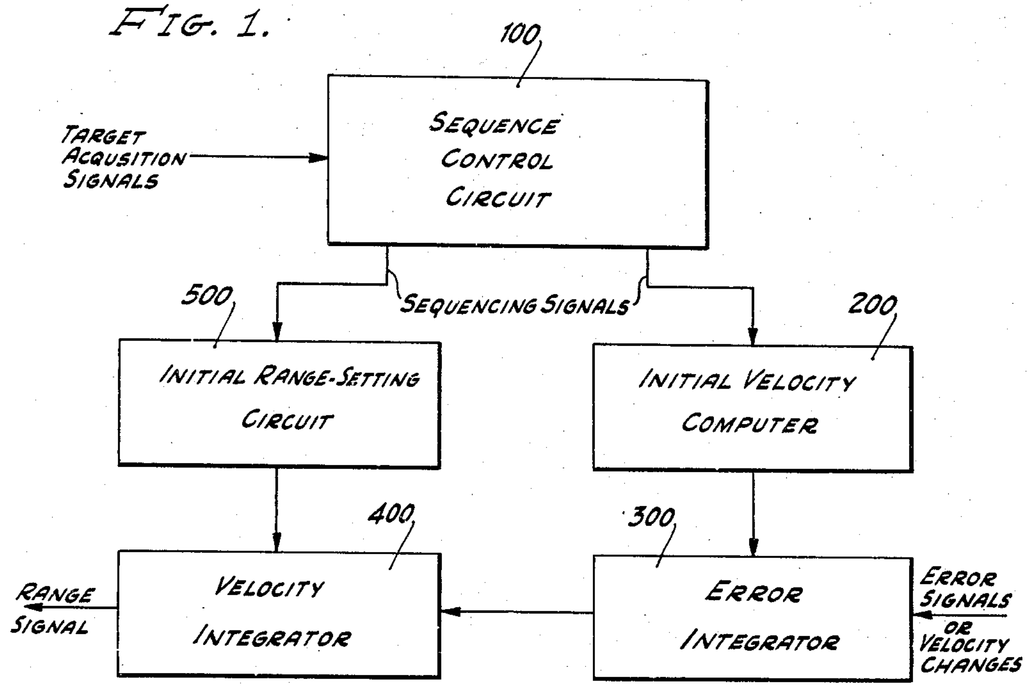
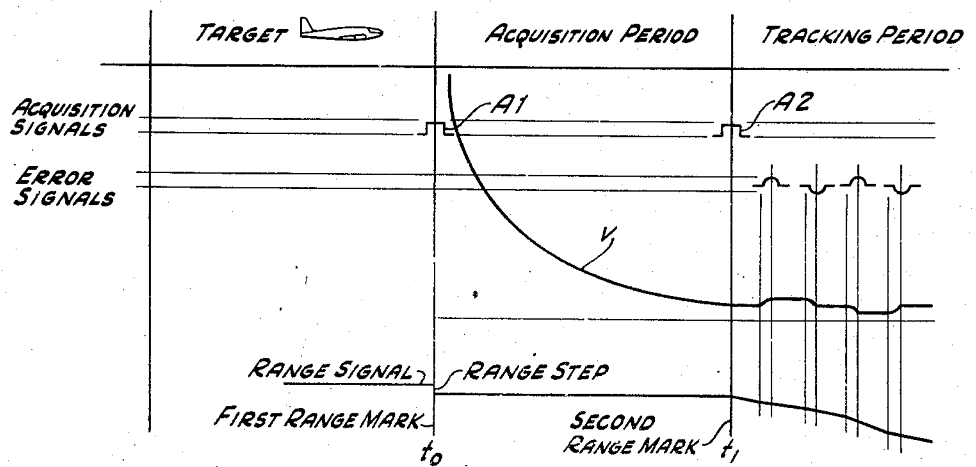
FIG. 1a.
LLOYD DAVID BALL,
BROOKS EHRMAN COWART,
GEORGE BRUER CRANE,
INVENTORS.
BY
ATTORNEY.

VARIABLE RANGE SIGNAL GENERATING CIRCUIT WITH MEANS FOR COMPUTING INITIAL VELOCITY

Filed March 7, 1955 2 Sheets-Sheet 2

LLOYD DAVID BALL,
BROOKS EHRMAN COWART,
GEORGE BRUER CRANE,
INVENTORS.

BY Edmund Kendrick
ATTORNEY.

United States Patent Office 2,832,537
Patented Apr. 29, 1958

1

2,832,537

VARIABLE RANGE SIGNAL GENERATING CIRCUIT WITH MEANS FOR COMPUTING INITIAL VELOCITY

Lloyd David Ball, Los Angeles, Brooks E. Cowart, Pacoima, and George Bruer Crane, Redondo Beach, Calif., assignors to Gilfillan Bros. Inc., Los Angeles, Calif., a corporation of California Application March 7, 1955, Serial No. 492,482

10 Claims. (Cl. 235—61.5)

This invention relates to a variable range signal generating circuit with means for computing initial velocity and, more particularly, to a circuit for producing a varying range signal as a function of the integral of velocity, where the velocity is computed on the basis of an initial condition plus the integral of any velocity changes resulting thereafter.

Although the present invention has a multitude of applications, it is particularly applicable to a ground controlled approach system of the general type described and claimed in copending U. S. patent application Serial No. 492,627 by Lloyd David Ball et al. for "Velocity Tracking System for Increasing the Range of Acquisition of Moving Targets" filed March 7, 1955. In this system the present invention forms part of a feedback loop which automatically corrects errors in a target range calculation. The invention is utilized in the system to produce a range signal which controls the function of a time-modulator circuit. The time-modulator circuit delays applied system trigger signals to produce range pulses after a time interval corresponding to the amplitude of the controlling range signal. The delayed range pulses thus produced are compared with actual target echoes in order to determine whether the computed range is greater or smaller than the actual target range. The system includes means for generating early and late signals indicating the sense and magnitude of the difference between the actual target range and the computed target range. These signals are combined to form an error signal which is utilized in the range signal generator of the present invention to indicate changes in target velocity.

According to the basic approach of the present invention, the range calculation is initiated by forming an initial velocity signal as a function of a predetermined range difference divided by a time interval difference, the range difference being specified by first and second range marking signals. The initial velocity signal thus formed is modified in an error signal integrator in accordance with subsequent changes in target velocity, the error signal integrator producing a velocity output signal based upon the computed inital velocity and any changes which may result thereafter. The velocity output signal is then integrated from an initial range condition in order to form a varying range signal. In this manner a range signal is generated as the function of target velocity, where the target velocity includes an initial velocity condition plus any velocity changes resulting thereafter.

In its basic structural form the invention comprises a sequence control circuit responsive to target acquisition signals for producing sequencing signals indicating the times of passage of the target through predetermined first and second ranges. The sequencing signals are utilized to actuate an initial velocity computer to produce an initial velocity signal representing the average velocity of the target between the first and second ranges. The sequencing signals are also utilized to transfer the initial velocity signal to an error signal integrator. The error signal integrator further receives error signals or velocity change signals and is operative to produce a varying velocity signal representing the target velocity after the second range.

The varying velocity signal is applied to a velocity integrator circuit whch also receives initial condition signals from an initial range-setting circuit controlled by the sequence control circuit. The velocity integrator is then operative to produce a varying range signal as a function of the varying velocity signal produced by the error signal integrator; the constant of integration being an initial range condition signal produced by the range-setting circuit, corresponding to the second range.

The basic means of the invention described above may be considered as arrangeable into several groups. For example, portions of the sequencing circuit may be considered to form parts of the other circuits according to the particular function which is performed. Thus the initial velocity computer and the corresponding control section of the sequencing circuit may be considered to be a means responsive to the first and second acquisition signals for producing an initial velocity signal. In a similar manner the velocity integrator, initial range setting circuit, and corresponding sequencing control circuits may be considered to form an integral means responsive to the acquisition signals and to the varying velocity signal produced by the error signal integrator for producing a varying range signal. Other basic arrangements will become apparent from the description and claims which follow.

In a more specific form of the invention, the initial velocity computer includes a rectangular hyperbolic function generator for producing an initial velocity signal $v$ defined by the function $v.t=\Delta d$, where $t$ represents an independent time variable and $\Delta d$ a distance difference which is assumed to be a constant. In operation the initial velocity computer may be assumed to generate the hyperbolic function from a time $t=t_0$ until a time $t=t_1$, where the conditions $t=t_0$ and $t=t_1$ corresponds to the times the target crosses the first and second range marks, respectively. In this manner the velocity signal $v$ is effectively produced as the function $$v=\Delta d/(t_0-t_1)=\Delta d/\Delta t$$

where $\Delta d$ is the range difference between the ranges specified by the first and second marks and $\Delta t$ is the time interval between $t_0$ and $t_1$.

Although many forms of hyperbolic function generators are available which may be employed by the present invention, an efficient mechanism is described and claimed in copending U. S. patent application Serial No. 494,178 for "Function Generating Circuits Requiring Only Linear Elements" by Books Ehrmon Cowart et al. filed March 14, 1955, which is particularly desirable. The feature of the circuit described in this copending application is that simple linear element exponential circuits are utilized, the desired hyperbolic function being derivable therefrom in a unique manner.

Certain circuits in the initial velocity computer also form part of the error signal generator and are first operative in producing the velocity signal of the hyperbolic function and then operative in an integrating constant capacity. Thus where the error signal integrator includes a D. C. amplifier and integrating capacitor, the integrating capacitor also forms part of the initial velocity computer. In this manner the same capacitor charging circuit may be utilized to generate the rectangular hyperbolic function, where the capacitor is utilized in one of the exponential charging circuits, and then is utilized as the integrating capacitor where its initial charge formed during the previous operation corresponds to initial velocity.

The technique of utilizing the same circuit elements for initial condition computation and subsequent integration from the computed initial condition as a constant of integration may have general applicability in the field of analog computing. Thus this feature of the invention is not limited to utilization in a range signal generator application and is claimed herein as an important subcombinational contribution.

Accordingly, it is an object of the present invention to provide a range signal generating circuit for producing a variable range signal as a function of the integral of target velocity.

Another object of the invention is to provide a signal generator which may be used in a velocity tracking system to provide a varying range signal, where the range variation is determined by target velocity, the signal generator being actuable to modify the varying range signal produced in accordance with velocity changes or errors.

A further object is to provide an initial velocity computer for indicating the average target velocity between first and second range marking signals indicating the times that a target passes through corresponding ranges.

Still another object of the invention is to provide a circuit for computing initial target velocity in response to applied target acquisition signals indicating the time of passage of a target through predetermined first and second ranges, the velocity being determined as a rectangular hyperbolic function $v.t = \Delta d$.

Yet a further object of the invention is to provide a signal generator circuit for producing a variable range signal in accordance with the integral of a computed initial target velocity as modified by any errors or changes in velocity occurring thereafter.

Still a further object is to provide a circuit for integrating from a computed initial condition introduced before the integration to provide an integrating constant; the element utilized to receive the initial condition in the preintegration operation being also utilized in the integration operation.

The novel features which are believed to be characteristic of the invention, both as to its organization and method of operation, together with further objects and advantages theerof, will be better understood from the following description considered in connection with the accompanying drawings. It is to be expressly understood, however, that the drawings are for the purpose of illustration and description only, and are not intended as a definition of the limits of the invention.

Fig. 1 is a block diagram of the basic embodiment of a variable range signal generating circuit, according to the present invention;

Fig. 1*a* is a composite set of waveforms appearing at various points in the circuit of Fig. 1 during a typical operation;

Fig. 2 is a schematic diagram of a specific form of the invention utilizing one species of the rectangular hyperbolic function generator.

Reference is now made to Fig. 1 wherein the basic embodiment of the present invention is shown in block diagram form. As shown in Fig. 1, the basic embodiment comprirses a sequence control circuit 100 for receiving applied target acquisition signals and for producing sequencing signals indicating the times of passage of a target through predetermined first and second ranges. The sequencing signals produced by circuit 100 are utilized to initiate the operation of an initial velocity computer 200 providing an initial velocity signal representing the average velocity of the target between the first and second ranges.

The sequencing signals produced by circuit 100 are also utilized to control the transfer of the initial velocity signal to an error integrator 300 which further receives applied error signals or velocity change signals. Circuit 300 is responsive to the applied input signals to produce a varying velocity signal representing the target velocity after the second range.

The varying velocity signal produced by circuit 300 is applied to a velocity integrator 400 which also receives initial condition signals produced by an initial range-setting circuit 500 controlled by circuit 100.

While sequencing control circuit 100 has been shown as a separate device, it will be understood that it is separable into a plurality of circuits corresponding to its various functions, each of the separated circuits then being considered to form part of the means controlled. Thus the section of circuit 100 which controls the sequencing of initial velocity computer circuit 200 may be considered to form part of that means forming a device for computing initial target velocity in response to applied acquisition signals. This subcombination, it may be noted, is considered as part of the present invention and claimed as such.

In a similar manner part of sequencing circuit 100 may be considered to be associated with velocity integrator 400 or with initial range setting circuit 500, each forming a separate means responsive to applied acquisition signals.

The general functional definition of the basic components of the invention may be better understood by considering the waveforms of Fig. 1*a* illustrating a typical operation.

As indicated in Fig. 1*a*, the system of the invention may be considered to function during three basic periods of operation. At the outset the system is in a preacquisition period before a target crosses a first range mark indicated by a corresponding range signal. The second period is initiated when the target crosses the first range mark and an acquisition signal is produced indicating the corresponding time of occurrence. This second period is designated as an acquisition period since it is during this period that an initial target velocity signal is acquired providing signal information for continuously tracking the target during the third or tracking period.

It will be noted in Fig. 1*a* that the range signal produced by the system is initially set to a first value representing the first range mark and is then stepped to a second value representing a second range mark upon receipt of a first acquisition signal A1 marking the time the target crosses the first range mark. The first acquisition signal A1 also actuates velocity computer 200 to produce the signal $v$ as the ratio of the range difference $\Delta d$ divided by the independent variable $t$, representing time.

The time that the first acquisition signal is produced is considered to be $t_0$ and marks the beginning of a time difference interval $\Delta t$ which is terminated upon receipt of a second acquisition signal A2 marking the time $t_1$ that the target passes a second range mark.

The receipt of the second acquisition signal A2, then, terminates the hyperbolic function generating operation of the initial velocity computer and causes the sequencing circuit to signal the beginning of the target velocity tracking period. During this period the initial velocity signal previously computed is integrated to form a varying range signal and is modified by adding error signals thereto to compensate for errors in initial velocity computation or target velocity changes.

While the invention provides a general technique for range signal generating through initial velocity computation and integration and is not limited to specific forms of circuits, one specific form of the invention is shown in Fig. 2 in order to illustrate an operable embodiment.

Referring now to Fig. 2, it is noted that acquisition signals A applied to sequence control circuit 100 are received by an amplifier stage 110 including a vacuum tube T111 receiving B+ potential through a load resistor R111 and having its cathode coupled through a cathode load resistor R112 and a capacitor C113 connected in parallel to a resistor R113 to ground. The acquisition signals are applied to the grid of tube T111 through an input resistor R114, the signal being developed across a load resistor R115.

When acquisition signal A1 is received by amplifier 110, capacitor C113 is rapidly charged to the peak value thereof and slowly discharges through resistor R113. This provides a sustained output signal which is effective through a resistor R121 to actuate a tube T120 to supply current to a relay $Rt_0$ through a current-limiting resistor R122. The current path of relay $Rt_0$ is completed to ground through a reset switch W.

Thus acquisition signal A1 is effective to actuate relay $Rt_0$ and transfer all corresponding contacts thereof; the transfer of relay $Rt_0$–1 removing a 28 volt potential applied through a resistor R131 to the grid of a tube T130. The 28 volt potential is transferred to provide holding current for relay $Rt_0$. In this manner, relay $Rt_0$ is actuated and held until subsequent release and tube T130, receiving anode potential through a load resistor R132, is changed from a normal highly-conducting condition with a resulting low impedance to ground, to a condition of low conductivity with high impedance to ground.

It will be noted that the grid of tube T130 is also connected to a voltage-retaining circuit 140 which is operative to retain the 28 volts previously provided through contact $Rt_0$–1 for a predetermined time interval to maintain the high-conducting condition of tube T130 until the end of this predetermined time interval. This time interval is selected on the basis of information indicating the minimum time interval to be expected between acquisition signals A1 and A2.

After tube T130 is in a condition providing a high impedance to ground a gating circuit is effectively opened for acquisition signal A2 which may then pass through resistor 132 to a tube T150 supplying current through a resistor R151 to a relay $Rt_1$. The current path for relay $Rt_1$, it will be noted, may also be interrupted by actuating switch W providing a ground connection therefor.

When relay $Rt_1$ is actuated in response to acquisition signal A2 contact $Rt_1$–1 is transferred providing a holding circuit so that the relay remains in an actuated condition until subsequent release by opening contact W. In addition contact $Rt_1$–2 in amplifier circuit 110 is transferred to provide a ground connection for the grid of tube T111 preventing the further passage of acquisition signals.

Thus acquisition signal A1 is effective to actuate relay $Rt_1$ which is then held and provides a switching function for opening a gate for acquisition signal A2 after the predetermined interval determined by the time constant of circuit 140. And, when signal A2 is received and held a switching function is performed which prevents further actuation of relays R*t*.

The switching signals provided by relays $Rt_0$ and $Rt_1$ in circuit 100 are utilized to control the operation of initial velocity computing and initial range setting circuits 200 and 500. It may be noted that the term signal as utilized herein may specify either a relay switching operation or an electrical signal since it is conceivable that the switch function provided by circuit 100 may be effected without relay circuits through the utilization of electronic switching signals. Therefore, the term signal is intended to include a mechanical function as well as an electrical function.

Referring specifically to the initial velocity computer 200, it will be noted that prior to actuation of relay $Rt_1$ contact $Rt_1$–3 remains unactuated and completes a resistance feedback path for a chopper stabilized D. C. amplifier stage 310 through a resistor R201. Suitable types of chopper-stabilized D. C. amplifiers are well-known in the art, typical circuits being shown and described, for example, on pages 200 through 210 of a book entitled "Electric Analog Computers," published in 1952, by Korn and Korn, New York and London.

It will also be noted that circuit 200 includes an integrating capacitor C202 which forms part of an integrating feedback loop for amplifier 310 after relay $Rt_1$ is actuated. Integrating capacitor C202 also forms part of a hyperbolic function generating circuit 220 which is inoperative prior to the actuation of relay $Rt_0$. The circuit connections of the hyperbolic function generating circuit 220 exist after relay $Rt_0$ has been actuated and all corresponding relay contacts have transferred. Thus it will be noted that capacitor C202 is connected to one end of a resistor R202 having its other end connected to ground. This connection forms a first RC exponential circuit 202. An output signal is derived from the junction of capacitor C202 and resistor R202 and is applied to a second exponential RC circuit 203 comprising a resistor R203 and a capacitor C203. The two exponential charging circuits are designed according to the principles introduced in the above-mentioned copending application by Cowart et al. for "Function Generating Circuits Requiring Only Linear Elements."

Prior to the actuation of relay $Rt_0$, capacitor C203 is discharged through normally closed relay contact $Rt_0$–3 to ground; and capacitor C202 is charged to a predetermined initial condition by an initial charging circuit 210 through normally closed contacts $Rt_1$–4 and $Rt_0$–2. Essentially, charging circuit 210 is a predetermined potential supply and is shown as including a voltage divider comprising series connected resistors R211 and R212 and a bypass capacitor C212 connecting the junction thereof to ground.

In operation then, circuit 200 essentially provides a resistive feedback circuit for amplifier 310 which results in a predetermined potential being applied to one terminal of capacitor C202. The potential applied to the other terminal of capacitor C202 is provided by initial charging circuit 210 in the manner described above. The status of circuit 200 at this point corresponds to a preacquisition condition.

As soon as the first acquisition signal A1 is received and relay $Rt_0$ is actuated, hyperbolic function generating circuit 220 goes into operation and generates the velocity signal $v$ as a function of a fixed range difference over variable time. This signal is generated as a varying charge across capacitor C202 so that at the end of the acquisition period upon actuation of relay $Rt_1$ capacitor C202 is entered into the feedback circuit of D. C. amplifier 310 with an initial charge corresponding to the computed initial velocity formulated as an average velocity equal to $\Delta d/\Delta t$, where $\Delta d$ is the range difference established and $\Delta t$ equals $t_1 - t_0$.

The switching signals provided by relays $Rt_0$ and $Rt_1$ are also utilized to control range setting circuit 500. Initially circuit 500 provides a range signal for chopper-stabilized D. C. amplifier stage 410 corresponding to the first range mark. During this time circuit 500 also provides a resistance feedback for D. C. amplifier 410 through a resistor R510 connected in parallel to a transient bypass capacitor C510. Thus initially D. C. amplifier 410 provides a constant amplification function generating the first range signal. The value of this first range signal may be adjusted through a range adjust potentiometer P520 coupled to resistor R510 by a resistor R521.

A second range signal is provided by amplifier 410 after relay $Rt_0$ is actuated and contact $Rt_0$–4 is transferred introducing a range step signal. The range step signal may be varied by adjusting a variable resistor R530 forming a voltage divider with series connected resistor R531; the junction of the two resistors provides a range step signal when relay contact $Rt_0$–4 is closed providing a ground connection, the signal being applied to the input circuit of amplifier 410 through an adding resistor R532 and normally closed contact $Rt_1$–5.

Thus when relay $Rt_0$ is actuated the input signal magnitude for amplifier 410 is stepped, resulting in a corresponding range signal step at the output circuit of the amplifier. This stepped range signal charges in integrating capacitor C540 to an initial value representing the second range mark through normally closed contact $Rt_1$–6. When relay $Rt_1$ is actuated contact $Rt_1$–6 is transferred completing a feedback path for capacitor C540 to the input circuit of amplifier 410.

It will be noted that a variable voltage-divider circuit 311 is shown coupled to amplifier 310 and may be considered to form part of the output circuit thereof. Variable voltage divider circuit 311 allows a scale-factor to be introduced into the velocity signal applied to amplifier 410 through transferred contact $Rt_1$–6.

The specific operation of the embodiment of Fig. 2 should now be readily understood. Acquisition signal A1 is effective through amplifier stage 110 and tube T120 to actuate relay $Rt_0$. The actuation of relay $Rt_0$ provides switching operations which initiate the operation of hyperbolic function generating circuit 210, from certain previously established signal conditions, and which step the range signal provided by circuit 500 from an initial value representing the first range mark to a stepped value representing the second range mark. The stepped signal is utilized to provide an initial range signal across integrating capacitor C540.

The actuation of relay $Rt_0$ also opens an effective gate after a time interval determined by circuit 140, allowing the passage of acquisition signal A2 through tube T150 to actuate relay $Rt_1$. This causes a switching function which prevents further acquisition signals from being effective.

The actuation of relay $Rt_1$ closes the integrating feedback loops for amplifiers 310 and 410; integrating capacitor C202 completing the loop for amplifier 310 and providing an initial velocity signal computed in circuit 210 as the function $\Delta d/\Delta t$, and integrating capacitor C540 completes the loop for amplifier 410 and provides an initial range signal corresponding to the second range mark. The switching of relay $Rt_1$ also completes a connection between amplifiers 310 and 410 through suitable scale factor providing means.

From the foregoing description it should now be apparent that the present invention provides a variable range signal generating circuit with means for computing initial velocity, the circuit being particularly useful in velocity tracking systems for increasing the range of acquisition of moving targets.

It should now be apparent that the invention may also be considered as providing a novel and useful initial velocity computer, forming a subcombinational part of the range signal generating circuit. The initial velocity computing circuit may be considered as including the necessary switching circuits in circuit 100, for providing switching to obtain initial signals for the hyperbolic function circuit 210 and switching for providing an output signal representing the final charge of integrating capacitor C202.

Another important subcombinational aspect which has been provided is the arrangement whereby an initial condition may be computed and then transferred to an integrating circuit, where the circuit element providing a stored representation of the initial condition during computation is also utilized subsequently in the integrating operation.

What is claimed is:

1. In a target tracking system where the range of a target is to be computed as a function of the integral of target velocity from an initial velocity condition computed between first and second ranges, the time of passage of the target through the first and second ranges being signaled by first and second acquisition signals, respectively; the combination comprising: first means responsive to the acquisition signals and to input signals representing any error or change in target velocity for producing a varying velocity signal, said first means including a first circuit for producing an initial velocity signal and a second circuit for receiving the initial velocity signal and any error signals to produce the varying velocity signal as a function of the initial velocity signal and the integral of the error signals; and second means responsive to said acquisition signals for establishing an initial range condition representing said second range and for integrating said varying velocity signal from said initial range condition to form a varying range signal.

2. A circuit for producing a target range signal as the integral of target velocity from an initial velocity condition computed between first and second acquisition signals indicating the times that the target passes through corresponding first and second ranges, the variations in the initial velocity condition being indicated by a varying error signal, said circuit comprising: an initial velocity computer responsive to said first and second acquisition signals for producing an initial velocity signal representing the average velocity of the target between the first and second ranges; an error signal integrator responsive to said initial velocity signal and to the error signals for producing a varying velocity signal representing the target velocity after the second range; a velocity integrating circuit responsive to said velocity signal for producing a varying range signal as the integral of said varying velocity signal; an initial range setting circuit for initially establishing a signal condition in said velocity integrator representing said second range; and a sequence control circuit for actuating said initial velocity computer and said initial range setting circuit to operate in the proper sequence.

3. A range computer for producing an output signal representing the varying range of a target as a function of the integral of the target velocity, the integral including an initial velocity condition corresponding to the average target velocity between first and second range marks represented by corresponding first and second signals, said computer comprising: first means responsive to said first and second signals for producing an initial velocity signal representing the average velocity of the target between the first and second range marks; second means responsive to said initial velocity signal for producing a velocity output signal as a function of said initial velocity signal and any changes in target velocity that may occur; and third means responsive to said second signal and to said velocity output signal for producing the range output signal as the integral of said velocity output signal from an initial condition corresponding to said second signal.

4. In a target tracking system where a variable range signal is to be computed as a function of the integral of target velocity from an initial velocity condition, an initial velocity computer comprising: an input circuit for receiving first and second acquisition signals indicating the time of passage of the target through first and second ranges, said input circuit producing corresponding first and second sequencing signals; a reciprocal function generating circuit actuable to produce a varying signal $v$ as a function of a range difference factor corresponding to the range between said first and second ranges, and as a function of the time difference following the occurrence of said first acquisition signal; first means responsive to said first acquisition signal for actuating said reciprocal function generating circuit to initiate said varying signal $v$; and second means responsive to said second acquisition signal for controlling the termination of operation of said reciprocal function generating circuit, the final signal of said function generating circuit representing the initial velocity condition.

5. The initial velocity computer defined in claim 4 wherein said first and second sequencing signals are relay switching signals; wherein said first means includes a first relay device responsive to said first sequencing signal for initiating said reciprocal function generating operation; and wherein said second means includes a second relay device responsive to said second sequencing signal for terminating said reciprocal function generating operation.

6. A circuit for producing an output signal representing an initial velocity condition determined as the average target velocity between the occurrence of first and second control signals representing the times that the target passes through first and second ranges, respectively, said circuit comprising: a function generator actuable to produce signal $v$ defined by the function $v.t=\Delta d$, where the value of the signal $v$ at the termination of operation of said function generator corresponds to the initial velocity condition, $t$ is an independent variable representing time after the occurrence of the first control signal, and $d$ is the range difference between said first and second ranges; a first control circuit coupled to said function generator responsive to the first control signal for actuating said function generator to produce said signal $v$; and a second control circuit coupled to said function generator responsive to the second control signal for terminating operation of said function generator.

7. The circuit defined in claim 6 wherein said function generator includes two resistance-capacitance exponential circuits coupled to provide an approximate simulation of said rectangular hyperbolic function.

8. A circuit for integrating an input signal from a precomputed constant, said circuit comprising: first means actuable to compute said constant, said first means including a capacitor which may be switched out thereof upon termination of the computing of said constant; second means actuable to integrate the input signal from an initial condition represented by said constant, said second means having an integrating feedback circuit including said capacitor, after the switching of said capacitor out of said first means; and third means coupled to said first and second means for actuating said first means to compute said constant, and for providing the switching of said capacitor to said second means.

9. The circuit defined in claim 8 wherein said first means is a hyperbolic function generator actuable to produce a signal $v$ across said capacitor, the signal $v$ being defined by the function: $v=\Delta d/t$, where $\Delta d$ is a constant and $t$ is an independent variable representing time; said third means being operative to actuate said first means at time $t_0$ and to switch said capacitor at time $t_1$, providing an initial condition for said third means equal to $\Delta d/\Delta t$, where $\Delta t$ is equal to $t_1-t_0$.

10. An initial velocity computer responsive to first and second input signals indicating the time of passage of a target through first and second marks, respectively, said computer comprising: first means responsive to said first signal for producing a reciprocal signal varying as a constant over time, where the constant is determined by the difference between said first and second marks; second means for receiving said reciprocal signal and for storing the instantaneous value of said reciprocal signal; and third means responsive to said second input signal for terminating the operation of said first means, the final stored value of said second means representing the initial velocity of the target through the first and second marks.

References Cited in the file of this patent

UNITED STATES PATENTS

| | | |
|---|---|---|
| 2,516,356 | Tull et al. | July 25, 1950 |
| 2,626,986 | MacNichol et al. | Jan. 27, 1953 |